S. LEWIS, Jr.
FARRIERY IMPLEMENT.
APPLICATION FILED OCT. 16, 1909.
1,016,571.
Patented Feb. 6, 1912.
3 SHEETS—SHEET 1.
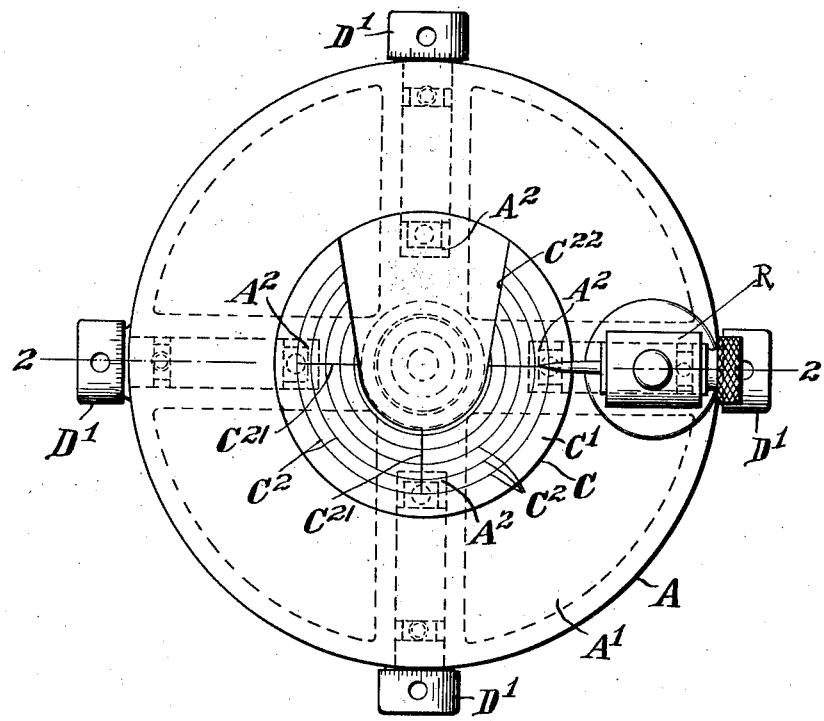
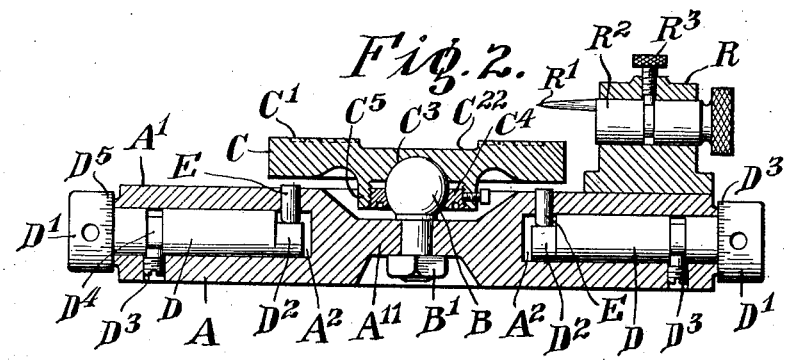

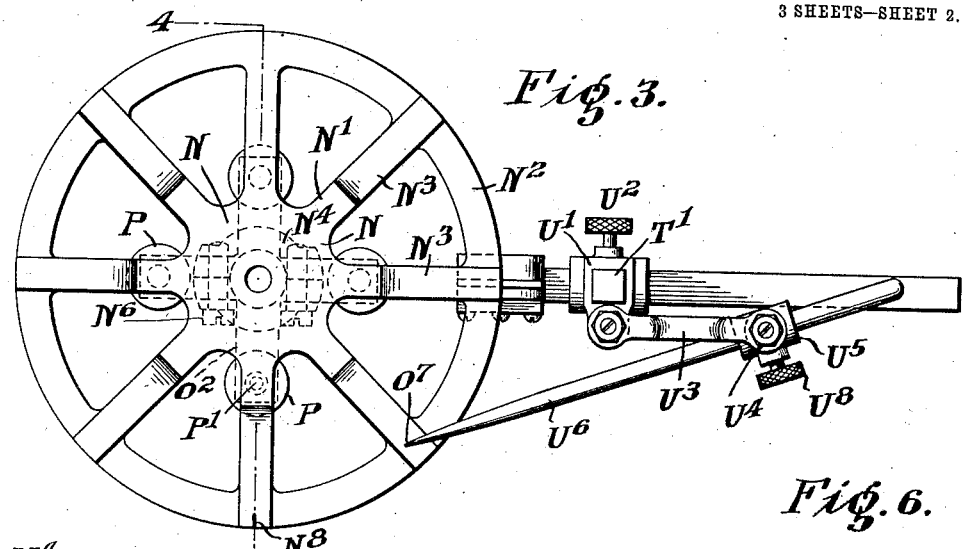
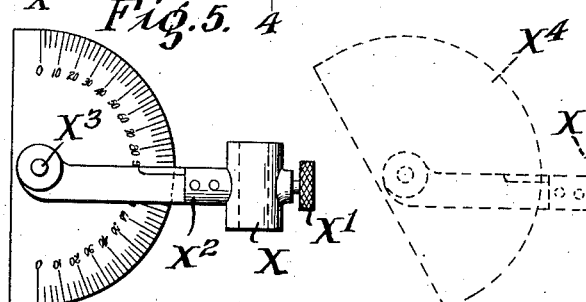
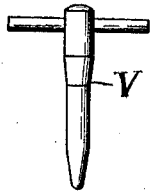
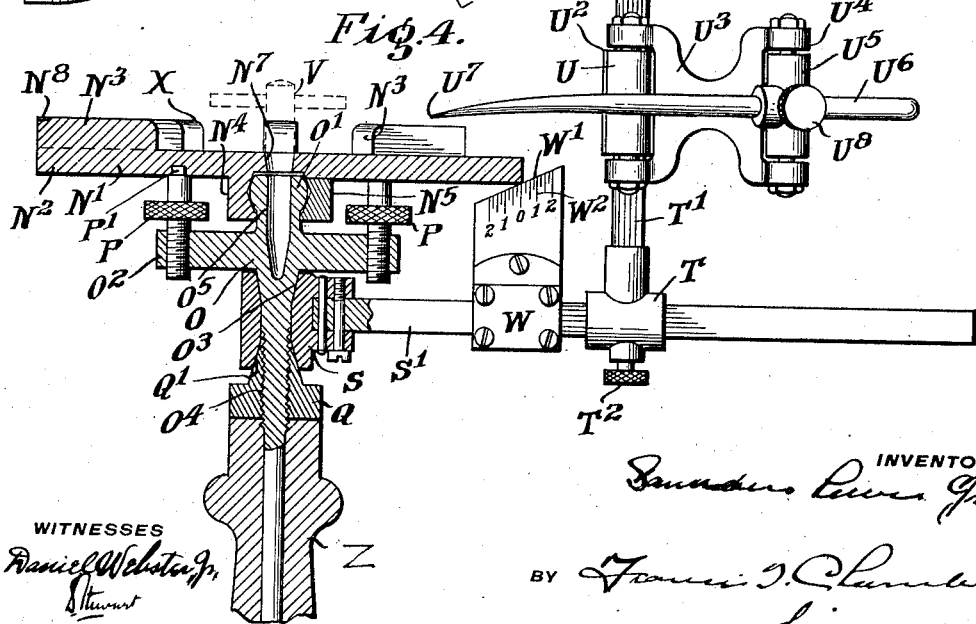

S. LEWIS, Jr.
FARRIERY IMPLEMENT.
APPLICATION FILED OCT. 16, 1909.
1,016,571.
Patented Feb. 6, 1912.
3 SHEETS—SHEET 3.
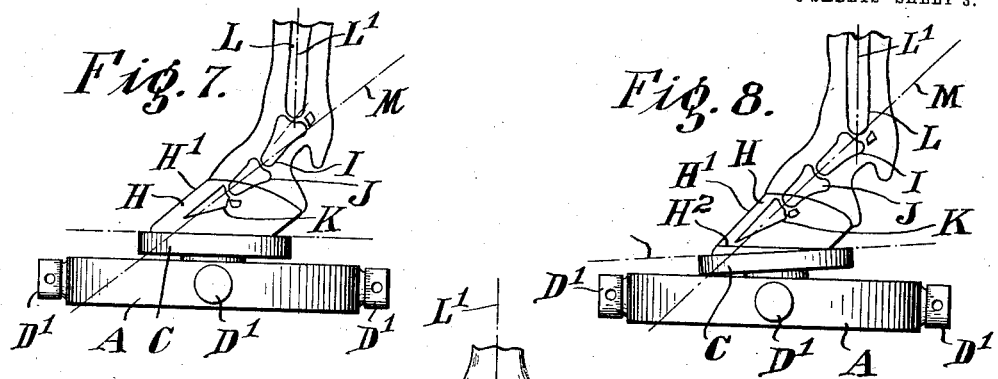
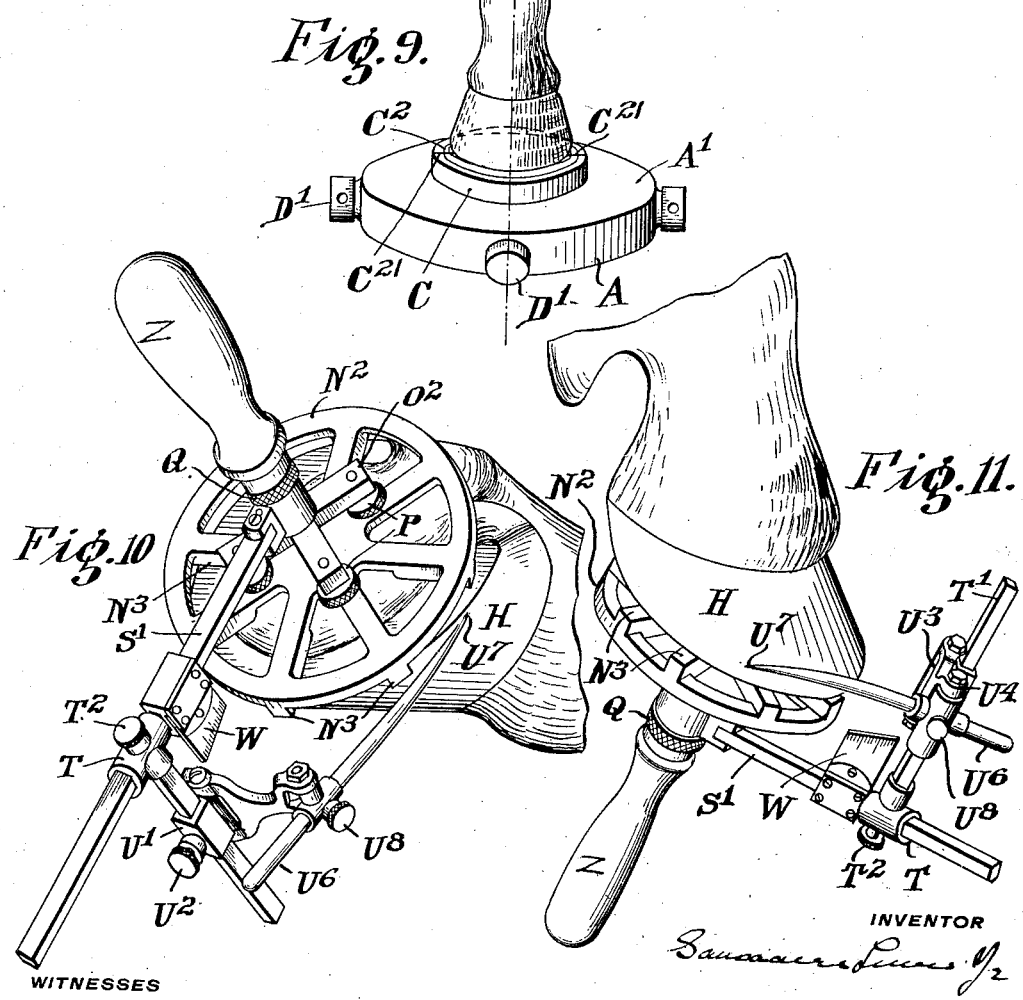
WITNESSES
INVENTOR
BY
ATTORNEY

UNITED STATES PATENT OFFICE.

SAUNDERS LEWIS, JR., OF PHILADELPHIA, PENNSYLVANIA.

FARRIERY IMPLEMENT.

1,016,571.  Specification of Letters Patent.  Patented Feb. 6, 1912.

Application filed October 16, 1909. Serial No. 522,940.

*To all whom it may concern:*

Be it known that I, SAUNDERS LEWIS, Jr., a citizen of the United States of America, residing in the city and county of Philadelphia, in the State of Pennsylvania, have invented a certain new and useful Improvement in Farriery Implements, of which the following is a true and exact description, reference being had to the accompanying drawings, which form a part thereof.

My present invention relates to the farriery art, and has for its object the provision of a simple and effective implement or device adapted to facilitate the proper trimming of a horse's hoof.

More particularly, one main object of the invention is the provision of an implement or device for indicating the manner in which a horse's hoof should be trimmed to change the plane of the bottom of the hoof a predetermined and definite amount. By preference, the implement or device has provisions by means of which the hoof may be readily and accurately scored or otherwise marked to indicate the manner in which the hoof should be trimmed after that manner has been determined.

A further object of the invention is the provision of an implement by which certain relations between different portions of the hoof may be accurately measured.

In the claims annexed to and forming a part of this specification, I have pointed out with particularity the features of novelty which characterize my invention. For a better understanding of the invention, however, and the advantages possessed by it, reference may be had to the accompanying drawings and descriptive matter in which I have illustrated and described forms in which the invention may be embodied.

Of the drawings, Figure 1 is a plan view of the implement with a scribing device, which I may use, in place on the implement. Fig. 2 is a sectional elevation on the line 2—2 of Fig. 1. Fig. 3 is a plan view of a modified form of apparatus. Fig. 4 is an elevation, partly in section, on the line 4—4 of Fig. 3, parts of the apparatus being shown in different relative positions in Figs. 3 and 4. Fig. 5 is an elevation of a device used, under certain conditions, with the apparatus shown in Figs. 3 and 4. Fig. 6 is an elevation of a centering device which may be used with the apparatus shown in Figs. 3 and 4. Fig. 7 is an elevation of the implement shown in Figs. 1 and 2 with a hoof and portion of a leg of a horse supported thereby. Fig. 8 is a view similar to Fig. 7, but showing the implement adjusted to set the bottom surface of the hoof in different relation to the leg from that shown in Fig. 7. Fig. 9 is a perspective view, showing the same parts as are shown in Figs. 7 and 8, but taken at right angles to Figs. 7 and 8. Figs. 10 and 11 are perspective views illustrating the use of the apparatus shown in Figs. 3 to 5, inclusive.

In the form of the invention shown in Figs. 1, 2, 7, 8 and 9 of the drawings, A represents a base member of disk like form. The member A has adjustably connected to it a hoof supporting member or table C, the top of which is adapted to be engaged by the underside of a horse's hoof. In the form shown, the table C is provided on its underside with a seat $C^3$ for a spherical bolt head B. The bolt head B is secured in place against the seat $C^3$ by means of an externally threaded member $C^4$ which is screwed into the internally threaded hollow boss $C^5$ provided for the purpose on the underside of the member C. The body of the bolt B passes through a portion $A^{11}$ of the member A, which is depressed and of reduced thickness. A nut B' secures the bolt in place. With the construction described, the table C is secured to the base A by a ball and socket joint, which permits the upper surface C' of the table C to be set at any angle, within proper limits, to the plane of the upper surface A' of the member A.

The base member A is provided with four equally spaced apart, radial, cylindrical chambers or sockets $A^2$. In each chamber $A^2$ is placed a cylindrical body D, held against axial displacement by a corresponding screw $D^3$ carried by the base member A and entering a circumferential groove $D^4$ formed in the member D. Each member D is provided at its inner end with an eccentrically disposed cylindrical portion $D^2$ and a sliding bolt or pin E passing through the upper wall of each corresponding socket $A^2$ which has its lower end resting on this eccentric portion $D^2$. The upper end of each pin is adapted to engage the underside of the table C. By rotating the member D the proper distance the pin E may be caused to engage and lock the table C in any desired position. Each member D is provided at its outer end with a head D' by means of which the member may be rotated in its socket and preferably, as shown, each head D' is provided with graduations or scale marks $D^5$ by means of which the angular position of the corresponding member D in any setting of the implement may be readily and accurately determined.

The upper surface of the table C is preferably slightly roughened to prevent a horse's hoof placed thereon from slipping, and preferably also is provided with marks as the circles $C^2$ and cross lines $C^{21}$ by means of which the hoof resting on the table may be readily centered. The marks $C^2$ and $C^{21}$ may be formed by scoring the table in such manner as to give the upper surface the desired roughness. The table C may also be recessed as indicated at $C^{22}$ to receive the frog of a hoof placed on it.

When it is desired to measure the relation between the bottom surface of the horse's hoof and the leg to which the hoof belongs, the hoof is centrally placed upon the table C as illustrated in Figs. 7, 8 and 9, and the table C is then manipulated to bring the hoof, the pastern joint and the leg proper into a certain standard or desired relation, for instance in the case of the front leg of a normal horse, the table is adjusted until when the axis L' of the large metacarpal or cannon bone L is vertical as shown in Fig. 8, the long pastern bone I, the short pastern bone J, and the hoof bone K are in alinement, with the axes of these bones coincident with the line M, Figs. 7 and 8, which passes through the center of the hoof bone K and is parallel to the line H' which marks the intersection with the front side of the hoof H, of a plane including the axes of the bones L, I, J and K. When this is done, by adjusting the various members D to throw out the pins E, the table C may be locked in the position into which it is adjusted and by means of the scale marks on the heads D' of the members D, the angular relation of the plane of the table C to the plane of the surface A' of base member A can be quickly and accurately determined. It will be understood, of course, that in this use of the apparatus the base member A is disposed in some standard position, usually and preferably with the surface A' horizontal.

Having set the table C in the position in which the hoof and pastern joint and main leg bones are in the proper or desired relation, the hoof may be readily marked for trimming in such manner that when the hoof rests upon a level surface the leg and pastern joint bones and hoof will naturally assume the desired relative positions. One way of accomplishing the marking in a very easy and satisfactory manner is by running a scribing tool, such as the tool R shown in Figs. 1 and 2, about the hoof with the base of the tool resting upon the guide surface formed by the surface A' of the table. By proceeding in this manner a line may be marked on the hoof at a uniform distance from the surface A'. For instance, in Fig. 8, the line $H^2$ indicates the line to which the hoof should be trimmed to make its bottom or shoe engaging surface horizontal when the bones L, I, J, and K are in the position shown in Fig. 8. The provision of this line on the hoof is a distinct advantage of itself, for, even when it is determined how a horse's hoof should be trimmed, it is difficult to conduct the actual operation of rasping the hoof to give the desired conformation without some line on the hoof which serves as a guide.

As shown, the scribing point R' is carried by and eccentrically disposed with respect to a cylindrical body $R^2$ received in a cylindrical socket formed in the body of the scriber. By rotating the member $R^2$ the distance between the scribing point R' and the surface A' may be adjusted. A clamping screw $R^3$ forms a means for locking the body $R^2$ in any desired adjustment.

In Fig. 8 the bones L, I, J and K are in the position usually occupied by them in the case of a normal horse with normally shaped hoofs when the horse is standing still on a horizontal surface. As shown in Fig. 8, however, the hoof is not normal but is too long at the toe, and Fig. 7 shows the actual position usually occupied by the bones L, I, J and K in the case of a normal horse with a hoof shaped as shown in Figs. 7 and 8 when the hoof rests on a horizontal surface.

It will be apparent, on inspection, that with the axes of the bones I, J and K in alinement as shown in Fig. 8, there is less strain on the tendons and muscles of the horse's leg than when the axes of these bones are out of alinement. It will also be apparent that if the bones I, J and K are in alinement when the axis L' of the bone L is vertical, as shown in Fig. 8, a greater decrease in the angle between the line M and the axis L' can occur without straining the tendons and muscles of the horse's leg, as the axis L' is inclined forward of the vertical in the stride of the horse, than is the case where the parts occupy the position shown in Fig. 7 when the axis L' of the bone L is vertical.

It is apparent that the implement described forms a simple and effective device for adjusting the hoof and the leg and pastern joint bones of the horse's leg in any desired relation, for measuring the inclinations of the bottom surface of the hoof to a standard plane such as the plane of the table A', when so adjusted, and for marking the hoof to show exactly how it should be trimmed to bring the hoof and pastern joint bones naturally into the desired relation when the hoof is placed on a level surface.

With horses which are more or less eccentric in their leg and hoof formation or gait, it is usually found that there is some one trimming of the hoof which will give much better results than any other. This is particularly true with horses used for speed purposes. With such horses, after the proper hoof trimming has been found by experiment, it is possible to determine by the use of my implement the exact relation of the hoof and leg and pastern joint bones which exists with that trimming, and by making a record of this relation it is possible to insure that when the hoof is to be trimmed again, it shall be trimmed in the proper manner.

Not only can the surface A' be used as a guide for a scribing tool such as the scriber R, but it can be used as the base for measuring the inclination of the hoof in different positions to the horizontal whereby a record may be made and kept of the changes which occur in the general shape of the hoof. Such a record may be highly useful, particularly in the case of horses used for speed purposes, for it is well known that horses' hoofs do not always grow uniformly, and a knowledge of the variations in growth of the particular portion of the horses' hoofs is sometimes of great value in determining the manner in which the hoof should be trimmed to give the desired result.

It will be apparent to those skilled in the art that the particular form of apparatus shown in Figs. 1, 2, 7, 8 and 9, possesses certain excellent properties, since it is strong and rigid, while at the same time compact, and in particular, has the distance between the top of the table C and the bottom of the base A relatively small. The latter is of importance, for, when this distance is small it is unnecessary to provide any special platform for the hoofs not resting on the table C, though it is usually advisable, in trimming a front or rear hoof, to bring the other front or rear hoof to the same level. This may be usually accomplished by the use of a plank or like simple blocking or platform.

In the modified form of the invention illustrated in Figs. 3 and 6, inclusive, N represents a skeletonized disk shaped member adapted to be brought into engagement with the bottom surface of the horse's hoof which is to be operated upon. As shown, the arms N', connecting the body of the member N to the rim $N^2$, are provided at their outer ends with shoulders or ribs $N^3$ on the upper side of the arms which engage the rim of the hoof while leaving a space for the frog of a hoof when the latter extends below the rim of the hoof. Preferably, the arm intended to come under the toe of the hoof has an identifying mark as indicated at $N^8$, and the arm at the opposite side of the device is not provided with shoulder $N^3$. It will be apparent that the provision of the spaced apart hoof supporting ribs or shoulders $N^3$, in this form of the invention, serve the purpose of providing a ribbed surface to facilitate the positioning of a hoof thereon and prevent it from slipping, which is accomplished in the construction first described by the provision of the ribs formed on the upper surface of the member A by the scorings or grooves C' and $C^{21}$. It will also be observed that the omission of the shoulder $N^3$ from one arm of the hoof support in Fig. 3, serves the purpose of forming a frog receiving recess. This is accomplished in the construction shown in Figs. 1 and 2 by providing the cavity $C^{22}$.

The member N is connected to a supporting member O, in the form of a shaft, by a universal joint. In the construction illustrated, the member O is provided at its upper end with a ball, and the member N is secured thereto by clamping members $N^4$ and $N^5$, one of which, $N^4$ for instance, is integrally connected to the member N, and is connected to the other member $N^5$ by clamping bolts $N^6$. The member O is provided below the ball O', with arms $O^2$, in which are screwed threaded leveling bolts or screws P. Preferably, as shown, one of the leveling screws P is provided with a reduced portion P' entering the corresponding socket formed in the arm N' above it so that the leveling screws always engage the same arms $N^7$. Beneath the arms $O^2$ a member S is journaled on the member O to turn about the axis thereof. The member S carries an arm S', square in cross section, which extends perpendicularly to the axis of the member O. To avoid lost motion and to insure the desired accurate angular relation between the member O and the arm S', the member O is preferably provided with a conical bearing surface $O^3$ and below the surface $O^3$ is threaded to receive a nut Q having a conical bearing surface Q'. The member S is provided with corresponding conical bearing surfaces engaging the surfaces $O^3$ and Q'. With this arrangement, any lost motion, due to wear or other cause, may be taken up from time to time by simply rotating the nut Q on the threaded portion of the member O. Below the nut Q, the member O has secured to it a suitable handle Z. On the arm S', a sleeve T, adjustable along the length of the arm is mounted.

$T^2$ represents a set screw for securing the sleeve T and arm S' together in any desired adjustment. The sleeve T supports an arm T', preferably square in cross section and extending parallel to the member O. A sleeve U is mounted on the arm T' and is adjustable up and down thereon.

U' represents a set screw for securing the sleeve U and arm T' together in any desired relation. An arm $U^3$ is pivotally connected at one end to the sleeve U, as by trunnions $U^2$, the axis of the trunnions extending parallel to the arm T'. At its other end, the arm $U^3$ is pivotally connected, as by the pivots $U^4$, to a member $U^5$ carrying a scribing device $U^6$. The axis of the pivots $U^4$ is parallel to the axis of the trunnions $U^2$ and to the axis of the shaft O. By rotating the arm S' relative to the member O, and by turning the arm $U^3$ relative to the sleeve U, and by turning the member $U^5$ relative to the arm $U^3$, the scribing point $U^7$ may be easily moved to draw a line about a hoof bearing against the top of the member N, and the line thus drawn with any one adjustment of the sleeve U will lie entirely in one plane perpendicular to the axis of the member O. By preference, the member $U^5$ is formed with a socket in which the scribing device $U^6$ may be adjusted in the direction of its length and may be clamped in any desired adjustment by the clamping screw $U^8$.

The plane of the member N can be set at any desired angle relative to the axis of the member O, within proper limits, by adjusting the leveling screws P. The relative position of the plane of the member N to the axis of the member O may be easily determined with a high degree of accuracy by means of the member W which is slidingly mounted on the arm S' and has an inclined upper edge W' adapted to engage the lower corner edge of the rim $N^2$. Scale marks $W^2$ are preferably provided along the edge W', and are preferably arranged to indicate in degrees or fractions thereof, the angle which the radial line in the plane of a line radial to the center of the ball O and parallel to the plane of member N' and in the plane of the member W, makes with the axis of the arm S'. With this arrangement, by swinging the arm S' around the highest or lowest point in the lower outer corner edge of the rim $N^2$ may be quickly determined, and of course the angle measured at that point by the member W, is the angle between the plane of the member N and a plane normal to the member O. It will be understood, of course, that the plane of the tops of the shoulders $O^3$ is parallel to the plane of the underside of the rim $N^2$ and that when the measuring device W is employed the lower outer corner edge of the rim $N^2$ should be truly circular about an axis passing through the center of the ball O'.

The angular relation between different portions of the curved surface of a horse's hoof and the plane of the member N can be determined readily by means of the adjustable quadrant $X^4$ pivotally connected at $X^3$ to an arm $X^2$ extending radially inward from the arm T' when the supporting sleeve X for the arm $X^2$ is mounted on the arm T'. The sleeve X may be adjusted along the arm T' and secured in any desired position by the clamping screw X' and in the ordinary use of the apparatus the sleeve X is removed when the scriber $U^6$ is in use.

Preferably, as shown, the member O is provided with a socket $O^5$ and the member N with a central passage $N^7$ to receive a centering device or plug V used to quickly and accurately bring the member N into the position in which its plane is perpendicular to the axis of the member O. In the use of the centering device V the leveling screws P are loosened and the plug then inserted. The act of insertion automatically brings the member N into the desired relation. The leveling screws are then tightened to hold the parts in this relation and the plug V removed. Preferably, the socket $O^5$ should be relatively deep and the passage $N^7$ be slightly conical and the plug V correspondingly shaped to eliminate errors due to lost motion.

The use of the apparatus shown in Figs. 3 to 5, inclusive, will be fairly apparent from what has already been said, and from an inspection of Figs. 10 and 11. The operator grasps the handle Z in one hand and holds the top of the shoulders $N^3$ against the bottom of a horse's hoof and then moves the scribing tool $U^6$ around to scribe a line on the horse's hoof or manipulates the quadrant $X^4$ to measure the angular relations between different portions of the hoof and the plane in which the arm S' swings. In making such measurements the plane touching the tops of the shoulders $N^3$, that is the plane bearing against the bottom surface of the hoof, is ordinarily normal to the axis of the member O and consequently parallel to the plane of movement of the arm S'. As shown in Figs. 10 and 11, the device may be used with the hoof of the horse's foot turned upward or with the hoof lifted off the ground but still pointed downward.

The apparatus shown in Figs. 3 to 6, inclusive, can be used in scribing on a hoof a line lying in a plane making any desired angle with the plane of the bottom of the hoof, and can be used in measuring the relation between different portions of the curved surface of the hoof and the bottom of the hoof just as accurately as can the apparatus shown in Figs. 1 and 2.

The apparatus shown in Figs. 3 to 6 cannot be used in setting a hoof in any desired relation to the bones of the horse's leg in the same way which it is possible to use the apparatus of Figs. 1 and 2, as shown in Figs. 7, 8 and 9, and in this respect the apparatus first disclosed possesses an advantage over the more portable form of apparatus. I have found, however, that by observing the feet and legs of a horse while standing on a level floor, and by observing the motion of the legs and the way in which the feet are put down and lifted up when the horse is in motion, that the manner in which the hoofs should be trimmed can be determined quite readily and accurately by one accustomed to make such observations, and when this has been determined the apparatus shown in Figs. 3 to 6, inclusive, can be employed to mark the hoofs for trimming in the desired predetermined manner. The apparatus shown in Figs. 3 to 6 possesses an obvious advantage over that shown in Figs. 1 and 2, because of the ease in which it can be transported and manipulated and because it weighs less and in general is less expensive to manufacture. On this account I prefer for general use the apparatus shown in Figs. 3 to 6, inclusive, to that shown in Figs. 1 and 2, although as before pointed out, the apparatus shown in Figs. 1 and 2 possesses some advantage over the lighter and more portable apparatus.

In my copending prior application, Ser. No. 488,452, filed April 7, 1909, I have disclosed and claimed specifically apparatus which is identical with that illustrated by Figs. 1 and 2, herein, except that in the earlier application no cavity $C^{22}$ is shown in the table C. My prior application, however, is to be regarded as subordinate to this in so far as the two forms of apparatus disclosed herein embrace common patentable features. Such common features are being claimed herein.

While different theories are entertained among those skilled in the art as to the exact manner in which horses' hoofs should be trimmed in order to get the best results, and in particular to correct certain defects in the gait of certain horses, the desirability of trimming the hoofs properly according to the particular theory entertained is recognized by everyone skilled in the art. Both forms of apparatus disclosed herein are highly useful because they permit of accurate indication of the manner in which a horse's hoofs should be trimmed to change the angular relation between the bottom surface of the hoof and the hoof proper by a predetermined known amount.

It will be apparent to those skilled in the art that changes may be made in the form of the implement disclosed herein without departing from the spirit of my invention, and I do not wish the claims hereinafter made to be limited to the particular apparatus disclosed more than is made necessary by the state of the art.

Having now described my invention, what I claim as new and desire to secure by Letters Patent is:

1. In a farriery implement, the combination of a member adapted to engage the bottom of a horse's hoof, and a support on which said member is adjustably mounted to permit the inclination of the member to the support to be varied, said support being provided with a guide for a tool for marking a hoof engaging said member.

2. In a farriery implement, the combination of a member adapted to engage the bottom of a horse's hoof, a support on which said member is adjustably mounted to permit the inclination of the member to the support to be varied, a scribing tool, and means carried by said support for guiding said scribing tool in its movement about a horse's hoof engaging said member.

3. In a farriery implement, the combination of a member adapted to engage the bottom of a horse's hoof, a support to which the member is connected by a universal joint, and means for locking the member and support together in any desired adjustment.

4. In a farriery implement, the combination of a member adapted to engage the bottom of a horse's hoof, a support to which the member is connected by a universal joint, and adjustable devices extending between the member and support for holding the member rigid with respect to the support in different adjustments of the member relative to the support.

5. In a farriery implement, the combination of a member adapted to engage the bottom of a horse's hoof, a support to which the member is connected by a universal joint, and bolts mounted in said support and adjustable into positions in which they engage the member and hold it rigid with respect to the support in different adjustments of the member relative to the support.

6. In a farriery implement, the combination of a member adapted to engage the bottom of a horse's hoof, a support to which the member is connected by a universal joint, and means carried by said implement for measuring the inclination of the member to the support in any desired adjustment of the member.

7. In a farriery implement, the combination of a member adapted to engage the bottom of a horse's hoof, a support to which said member is adjustably connected to permit the inclination of the member to the support to be varied, and means for locking the member and support together in any desired adjustment, said member having its hoof engaging surface ribbed to facilitate the proper positioning of the hoof thereon, and to prevent said hoof from slipping.

8. In a farriery implement, a member adapted to engage the bottom of a horse's hoof, a supporting handle therefor connected to the said member by a universal joint, an arm journaled on said handle to swing about the axis thereof, and a scribing device supported by said arm and adapted to engage a hoof bearing on said member.

9. In a farriery implement, a member adapted to engage the bottom of a horse's hoof, a supporting handle therefor connected to said member by a universal joint, an arm journaled on said handle to swing about the axis thereof, and means carried by said arm for measuring the relation between different portions of a hoof engaging said member.

10. In a farriery implement, a member adapted to engage the bottom of a horse's hoof, a supporting handle therefor connected to said member by a universal joint, means for locking said handle and said member together in different adjustments, an arm journaled on said handle to swing about the axis thereof, and a scribing device supported by said arm adapted to engage a hoof bearing against said member.

11. In a farriery implement, a member adapted to engage the bottom of a horse's hoof, a supporting handle therefor connected to said member by a universal joint, an arm journaled on said handle to swing about the axis thereof, a second arm pivotally connected to the first arm to turn relatively thereto about an axis parallel to the axis of movement of the first mentioned arm, and a scribing device carried by said second arm.

12. In a farriery implement, a member adapted to engage the bottom of a horse's hoof, a supporting handle therefor connected to said member by a universal joint, an arm journaled on said handle to swing about the axis thereof, a second arm pivotally connected to the first mentioned arm at one end, and a scribing tool pivotally connected to the other end of said arm adapted to engage a hoof bearing against said member, the axis of both pivotal connections with the second arm being parallel to the axis of movemnt of the first mentioned arm relative to said handle.

13. In a farriery implement, a member adapted to engage the bottom of a horse's hoof, a supporting handle therefor connected to the said member by a universal joint, an arm journaled on said handle to swing about the axis thereof, a second arm slidingly mounted on the first arm and extending parallel to the axis of movement of the first arm relative to the handle, a sleeve mounted on said second arm and adjustable along the length thereof, a third arm pivotally connected at one end to said sleeve, and a scribing device pivotally connected to the other end of said third arm, the pivotal connections at both ends of said third arm having their axes parallel to the axis of movement of the first mentioned arm.

14. In a farriery implement, a member adapted to engage the bottom of a horse's hoof, a support therefor connected to said member by a universal joint, means for adjusting the plane of the hoof engaging surface of said member relative to said support, said member and said support having openings adapted to register in a certain predetermined relative adjustment, and a plug adapted to be removably inserted in said opening to thereby hold said member and support in said relation.

15. In a farriery implement, a member adapted to engage the bottom of a horse's hoof, and formed with a circular gage engaging surface on its underside, a supporting handle for said member connected to the latter by a universal joint, an arm journaled on said handle to swing about the axis thereof, and a gage member mounted on said arm to slide longitudinally thereof and provided with an edge which is adapted to engage said circular surface and is inclined to the line of movement of said gage relative to said arm.

16. In a farriery implement, the combination of a member adapted to engage the bottom of a horse's hoof, a support to which said member is adjustably connected to permit the inclination of the member to the support to be varied, and means for locking the member and support together in any desired adjustment, said member having its hoof engaging surface provided with a frog receiving recess.

SAUNDERS LEWIS, Jr.

Witnesses:
ARNOLD KATZ,
D. STEWART.

---

Copies of this patent may be obtained for five cents each, by addressing the "Commissioner of Patents, Washington, D. C."